United States Patent
Mizan et al.

(10) Patent No.: US 8,822,744 B2
(45) Date of Patent: Sep. 2, 2014

(54) MULTI-STAGE CO-PROCESSING OF BIOFEEDS FOR MANUFACTURING OF DIESEL RANGE HYDROCARBONS

(75) Inventors: Tahmid I. Mizan, Bridgewater, NJ (US); Zhiguo Hou, Fairfax, VA (US); William E. Lewis, Baton Rouge, LA (US)

(73) Assignee: ExxonMobil Research and Engineering Company, Annandale, NJ (US)

( * ) Notice: Subject to any disclaimer, the term of this patent is extended or adjusted under 35 U.S.C. 154(b) by 1061 days.

(21) Appl. No.: 12/809,294

(22) PCT Filed: Dec. 20, 2007

(86) PCT No.: PCT/US2007/026042
§ 371 (c)(1),
(2), (4) Date: Sep. 20, 2010

(87) PCT Pub. No.: WO2009/082366
PCT Pub. Date: Jul. 2, 2009

(65) Prior Publication Data
US 2012/0053377 A1    Mar. 1, 2012

(51) Int. Cl.
*C07C 1/00*    (2006.01)
*C10G 65/04*    (2006.01)

(52) U.S. Cl.
USPC ............ 585/240; 585/242; 44/605; 44/606; 208/210; 208/213

(58) Field of Classification Search
USPC .............. 585/240, 242, 733; 44/605, 606; 208/113, 208 R, 213, 89
See application file for complete search history.

(56) References Cited

U.S. PATENT DOCUMENTS

| | | | | |
|---|---|---|---|---|
| 4,992,605 A | * | 2/1991 | Craig et al. | 585/240 |
| 5,705,722 A | * | 1/1998 | Monnier et al. | 585/240 |
| 7,550,634 B2 | * | 6/2009 | Yao et al. | 585/240 |
| 7,781,629 B2 | * | 8/2010 | Marchand et al. | 585/240 |
| 7,872,165 B2 | * | 1/2011 | Bertoncini et al. | 585/240 |
| 8,067,657 B2 | * | 11/2011 | Duarte Santiago et al. | 585/733 |
| 8,193,399 B2 | * | 6/2012 | Gosling | 585/14 |
| 8,366,910 B2 | * | 2/2013 | Roberto Gomes et al. | 208/89 |
| 8,551,327 B2 | * | 10/2013 | Lewis et al. | 208/210 |
| 2003/0221994 A1 | | 12/2003 | Ellis et al. | |
| 2006/0186020 A1 | * | 8/2006 | Gomes | 208/46 |
| 2007/0260102 A1 | * | 11/2007 | Duarte Santiago et al. | 585/733 |
| 2008/0161614 A1 | * | 7/2008 | Bertoncini et al. | 585/240 |
| 2008/0173570 A1 | * | 7/2008 | Marchand et al. | 208/107 |
| 2009/0166256 A1 | * | 7/2009 | Lewis et al. | 208/89 |
| 2010/0270207 A1 | * | 10/2010 | Gomes et al. | 208/49 |

FOREIGN PATENT DOCUMENTS

| | | |
|---|---|---|
| EP | 1 741 768 A1 | 1/2007 |
| EP | 1 857 525 A1 | 11/2007 |
| EP | 1 693 432 B1 | 9/2009 |
| WO | WO 2006/100584 * | 9/2006 |
| WO | 2007/003709 A1 | 1/2007 |
| WO | 2007/125332 A1 | 11/2007 |

OTHER PUBLICATIONS

George W. Huber, Paul O'Connor, Avelino Corma, "Processing biomass in conventional oil refineries: Production of high quality diesel by hydrotreating vegetable oils in heavy vacuum oil mixtures", Applied Catalysis A: General 329 (2007) pp. 120-129.

* cited by examiner

*Primary Examiner* — Nina Bhat
(74) *Attorney, Agent, or Firm* — Chad A. Guice (57) ABSTRACT

Processes are provided for producing a diesel fuel product having a sulfur content of 10 ppm by weight or less from feed sources that include up to 10% by weight of a biocomponent feedstock. The mineral hydrocarbon portions of the feed sources can be distillate or heavier feed sources.

36 Claims, 4 Drawing Sheets

MULTI-STAGE CO-PROCESSING OF BIOFEEDS FOR MANUFACTURING OF DIESEL RANGE HYDROCARBONS

FIELD OF THE INVENTION

This invention provides a process for the manufacture of diesel range hydrocarbons that are low in sulfur and that include up to 20% by weight of a biocomponent feedstock. Particularly the invention relates to a multi-stage co-hydrotreating process for the manufacture of diesel range hydrocarbons from at least one biocomponent feedstock and at least one mineral hydrocarbon feedstock.

BACKGROUND OF THE INVENTION

Environmental interests, governmental regulations and incentives, and an increasing worldwide demand for energy are resulting in increased interest in renewable energy sources, such as hydrocarbon fuels derived from biological raw materials. In the manufacture of diesel fuels, one area of interest has been production of suitable diesel fuel via processing of vegetable oils and animal fats that contain triglycerides of fatty acids. Triglycerides contain three linear and mostly saturated hydrocarbon chains (normally 8 to 22-carbon atoms) that are linked together by an ester backbone. When the ester backbone is removed, the remaining linear hydrocarbon chains correspond chemically to hydrocarbons typically present in mineral (i.e., conventional) diesel fuels.

One conventional approach for converting vegetable oils or other fatty acid derivatives into liquid fuels in the diesel boiling range is by a transesterification reaction with an alcohol in the presence of a catalyst, such as sodium hydroxide. The obtained product is a fatty acid alkyl ester, and typically is a fatty acid methyl ester (FAME). While fatty acid alkyl esters have many desirable qualities, such as high cetane, there are issues associated with their use directly as diesel fuels. Fatty acid alkyl esters typically have poor cold flow properties due to a large weight percentage of straight chain hydrocarbons. Additionally, fatty acid alkyl esters often have low oxidation stability related to the presence of ester moieties and unsaturated carbon-carbon bonds.

Hydrogenation of vegetable oils or other fatty acid derivatives by co-processing with mineral diesel feedstocks is another approach for conversion of biologically derived feeds to hydrocarbon liquids in the diesel boiling range. This method removes undesirable oxygen by hydrodeoxygenation or hydrodecarboxylation reactions, and saturates the unsaturated carbon-carbon bonds present in feed molecules.

Hydrodeoxygenation and/or hydrodecarboxylation reactions are in many ways similar to other forms of hydrotreating currently used in refining of mineral hydrocarbon feedstocks, and therefore can potentially be practiced using existing infrastructure. However, hydrodeoxygenation reactions are highly exothermic relative to hydrodesulfurization and also require relatively large amounts of hydrogen. The excess heat generated by the hydrodeoxygenation reaction combined with the high levels of required hydrogen can lead to undesirably high reaction temperatures or low hydrogen availability in the feed stream during hydroprocessing. These undesirable conditions can lead to increased formation of unwanted side reaction products and coking of catalyst. Unwanted side reactions, such as cracking, polymerization, ketonization, cylization and aromatization decrease the yield and the beneficial properties of a diesel fraction. Additionally, unsaturated feeds and free fatty acids in triglyceridic biologically derived oils may also promote the formation of high molecular weight compounds that are not desirable in a diesel fuel. Therefore, there is a need for an improved process for refinery hydrotreatment of hydrocarbon streams that include a biologically derived feedstock, such as vegetable oils and/or animal fats.

Still another conventional approach to producing a diesel fuel including a biologically derived feedstock is to separately process both a mineral hydrocarbon feedstock and the biologically derived feedstock. The processed feedstocks can then be blended to produce a desired diesel fuel. While separate processing allows preferred conditions to be selected for each feedstock individually, this strategy requires significant additional equipment footprint in a refinery, as dedicated process trains are required for both feedstocks. Thus, this solution is not favorable from a cost standpoint.

Separately, regulatory requirements continue to reduce the level of sulfur that is permitted in diesel fuels. In order to meet worldwide regulatory standards, processes are needed that allow for production of diesel fuel with 10 ppm or less of sulfur.

EP 1693432 describes a process for production of a diesel fuel that includes hydrotreatment of a feedstock containing from 1-75% of a vegetable oil, with the balance of the feedstock being a mineral hydrocarbon feed. The mixed feedstock of vegetable and mineral oil is co-processed in at least one hydrotreatment stage. Sulfur levels in the resulting diesel fuel are not disclosed in EP 1693432.

U.S. Pat. No. 4,992,605 describes a process for hydrotreating various types of oils of biological origin for use as diesel fuel extenders. The hydrotreated oils are then separated and diesel component is removed for mixing with a conventional diesel fuel.

EP 1741768 describes a process for producing diesel range hydrocarbons from bio oils and fats. The feedstock for processing includes a bio oil or fat and a diluting agent. The diluting agent can be a traditional hydrocarbon stream. The combined bio oil or fat and diluting agent feedstock is then passed into a reactor at two different location. The first bio oil or fat and diluting agent stream enters the reactor above the first reaction bed, while the second stream, also containing bio oil or fat and diluting agent, enters the reactor downstream from the first reaction bed.

SUMMARY OF THE INVENTION

In an embodiment, a method is provided for producing a low sulfur diesel product. The method begins by introducing a feedstock having a T5 boiling point of about 300° F. or greater and containing a biocomponent portion of up to 20% by weight into a first reaction zone. The feedstock is hydrotreated in the first reaction zone under first effective hydrotreating conditions to produce a first hydrotreated feedstock having a sulfur content less than about 2500 ppm by weight; wherein at least 90 wt % of the oxygen is removed from the feedstock. The first hydrotreated feedstock is then separated into a vapor stream and a liquid stream, the vapor portion containing hydrogen gas. At least a portion of first hydrotreated feedstock is then passed to a second reaction zone without passing the vapor portion containing hydrogen gas. The portion of the first hydrotreated feedstock in the second reaction zone is hydrotreated under second effective hydrotreating conditions to produce a diesel boiling range product.

In another embodiment, a method is provided for producing a low sulfur diesel product. The method begins by introducing a feedstock having a T5 boiling point of about 300° F. or greater and containing a biocomponent portion of up to 20% by weight into a first reaction zone. The feedstock in the first reaction zone is hydrotreated under first effective hydrotreating conditions to produce a first hydrotreated feedstock having a sulfur content less than about 2500 ppm by weight, wherein at least 90 wt % of the oxygen is removed from the feedstock. The first hydrotreated feedstock is separated into a vapor stream and a liquid stream, the vapor portion containing hydrogen gas. At least a portion of the vapor stream is passed into a hydrogen recycle loop, while at least a portion of the liquid stream is passed to a second reaction zone. The liquid portion of the first hydrotreated feedstock in the second reaction zone is then hydrotreated under second effective hydrotreating conditions to produce a hydrotreated product having a sulfur content of about 10 ppm by weight or less. The second hydrotreated product is separated into a vapor product and a diesel boiling range product, the vapor product containing hydrogen gas. At least a portion of the vapor product is also passed into the hydrogen recycle loop. The portion of the vapor stream and the portion of the vapor product in the hydrogen recycle loop are treated with a CO removal system. This recycled hydrogen from the hydrogen recycle loop is passed into the first reaction zone as a hydrogen treat gas.

DETAILED DESCRIPTION OF THE EMBODIMENTS

This invention provides processes for producing diesel fuels that include up to 20% by weight of a biocomponent feedstock and also have sulfur levels of 10 ppm or less. In an embodiment, the desired goals of the invention are achieved by co-processing the mineral hydrocarbon feedstock and the biocomponent feedstock in a reaction system having multiple reactors that include a hydrotreatment stage. In such an embodiment, both feedstocks are subjected to hydrotreatment in two or more reactors, each having at least one hydrotreatment stage. This embodiment provides the advantage that a broader range of temperature and pressure conditions can be selected for each hydrotreatment stage because each stage is in a separate reactor. This can assist with maintaining a desired temperature during deoxygenation of the biocomponent feedstock, which is typically an exothermic process. Use of multiple reactors also allows for substantially complete deoxygenation of the biocomponent portion of the feedstock in the first reactor. The catalytic inhibition effect produced during hydrotreatment of biocomponent feeds can then be avoided in the second reactor where the sulfur level is reduced to 10 wppm or less.

In the discussion below, a biocomponent feedstock refers to a hydrocarbon feedstock derived from a biological raw material component, such as vegetable oil or animal fat. The vegetable oils and animal fats that can be used in the present invention include any of those which comprise primarily triglycerides and free fatty acids (FFA). The triglycerides and FFAs contain aliphatic hydrocarbon chains in their structure having 8-24 carbons. Examples of biocomponent feedstocks include but are not limited to canola oil, corn oil, soy oils, castor oil, and palm oil.

A mineral hydrocarbon feedstock refers to a hydrocarbon feedstock derived from crude oil that has optionally been subjected to one or more separation and/or other refining processes. Preferably, the mineral hydrocarbon feedstock is a petroleum feedstock boiling in the distillate range or above. Such a feedstock typically has a boiling range from about 300° F. (149° C.) to about 840° F. (449° C.), preferably from about 350° F. (177° C.) to about 750° F. (399° C.). Alternatively, the feedstock can be characterized in terms of the boiling points at which various fractions of the feedstock will boil at. For example, the T5 boiling point refers to the temperature at which 5 percent of the feedstock will boil, while the T95 boiling point refers to the temperature at which 95 percent of the feedstock will boil. In an embodiment, the feedstock has a T5 boiling point of at least about 300° F. In another embodiment, the feedstock has a T95 boiling point of about 775° F. or less, preferably 725° F. or less. In various embodiments, the feedstock contains greater than about 50 wppm sulfur, or greater than about 0.1 wt % sulfur, or greater than about 0.25 wt % sulfur, or greater than about 0.5 wt % sulfur, or greater than about 1 wt % sulfur, or greater than about 2 wt % sulfur prior to processing according to the invention. Examples of suitable feedstocks include virgin distillates, hydrotreated virgin distillates, light gas oils, heavy gas oils, light catalytic cycle oils, light cycle oils, and vacuum gas oils.

Co-processing of biocomponent feedstock with a conventional distillate or other mineral hydrocarbon feedstock is one option for the manufacture of renewable diesel using existing refinery equipments. However, biocomponent feedstocks also pose difficulties due to catalyst poisoning. Biocomponent feedstocks, such as vegetable oils and animal fats, typically containing triglycerides and fatty acids. Addition of biocomponent feedstocks into conventional distillates inhibits catalytic hydrodesulfurization activity of conventional hydrotreating catalysts, such as catalysts having CoMo or NiMo supported on alumina. Without being bound by any particular theory, it is believed that two factors contribute to the catalytic inhibition. First, the large triglyceride and fatty acid molecules in biocomponent feedstocks may competitively adsorb on and block active sites of hydrotreating catalysts. This competitive adsorption reduces the active sites available for hydrodesulfurization. As a result, co-processing of biocomponent feedstocks slows the kinetics of hydrodesulfurization. If this change in kinetics is not compensated for, co-processing of mineral hydrocarbon feedstock with a biocomponent feedstock can result in an increase in the sulfur concentration of the treated feedstock, as compared to the sulfur concentration resulting from treatment of only the mineral hydrocarbon feedstock. Second, hydrodeoxygenation of biocomponent feedstocks is believed to produce increased levels of CO relative to hydroprocessing of a mineral hydrocarbon feedstock. The increased levels of CO produced during hydrodeoxygenation are also believed to inhibit catalytic activity of hydrodesulfurization catalysts.

To overcome the above difficulties, the inventive method provides for multi-stage co-processing of feedstock. In a first hydrotreatment reactor, the biocomponent portion of the feedstock is substantially deoxygenated. This corresponds to removing at least 90%, or at least 95%, or at least 98%, or at least 99% of the oxygen present in the biocomponent feedstock. Alternatively, substantially deoxygenating the feedstock can correspond to reducing the oxygenate level of the total feedstock to 0.1 wt % or less, or 0.05 wt % or less, or 0.01 wt % or less, or 0.005 wt % or less. The hydrotreatment in the first hydrotreatment reactor is also used to remove some sulfur from the feedstock. In an embodiment, the sulfur level of the treated feedstock after hydrotreatment in the first reactor is 2500 wppm or less, or 2000 wppm or less, or 1500 wppm or less, or 1000 wppm or less.

Two types of feed covered by the current invention are mineral distillates and bio-feeds (feeds of bio-origin). In terms of overall liquid volume, the portion of biofeed is from 0.1% to 50% of total feed volume, preferably 0.1% to 20% of total feed volume. Preferably, in the embodiments described below, the reactors and reaction zones are operated in a co-current manner.

Multi-Stage Co-processing of Biocomponent Feedstocks

In the following embodiments, a mineral hydrocarbon feedstock and a bicomponent feedstock are co-processed in a multi-stage reaction system. Preferably, the mineral hydrocarbon feedstock is a diesel boiling range feedstock, with a T5-T95 range of 300 to 775° F. The biocomponent portion of the feedstock can account for from about 0.1 to about 50% by weight of the combined feedstock, with amounts up to about 20% by weight, or up to about 15% by weight, or up to about 10% by weight being preferred. For convenience, this group of embodiments will be described based on a reaction system containing two hydrotreatment reactors, but those of skill in the art will readily understand how additional reactors could be added to the reaction system.

The combined feedstock is introduced into a first hydrotreatment reactor that includes one or more catalyst beds that contain a hydrotreatment catalyst. The combined feedstock is exposed to each catalyst bed while being exposed to hydrodesulfurization and hydrodeoxygenation conditions. Such conditions will also result in olefin saturation of any olefins present in the biocomponent feedstock. In this first hydrotreatment reactor, low pressure conditions are used that allow for deoxygenation of the biocomponent portion of the feedstock, as well as allowing for removal of a portion of the sulfur and nitrogen in the feedstock. The use of a lower pressure in the first reactor allows for improved control of the reaction conditions, which aids in countering the highly exothermic nature of the deoxygenation reactions.

The catalyst in the first hydrotreatment reactor can be a conventional hydrotreating catalyst, such as a catalyst composed of a Group VIB metal and/or a Group VIII metal on a support. Suitable metals include cobalt, nickel, molybdenum, tungsten, or combinations thereof Suitable supports include silica, silica-alumina, alumina, and titania.

The reaction conditions in the first hydrotreatment reactor can be conditions suitable for reducing the sulfur content of the feedstream while also deoxygenating the feedstream and saturating olefins as the feedstream is exposed to the catalyst beds in the reactor. In a preferred embodiment, the reaction conditions of the first hydrotreatment reactor are selected to perform a thorough hydrodeoxygenation while reducing the sulfur of the feedstock to a value between about 1000 wppm and 1500 wppm S. The reaction conditions can include an LHSV of 0.25 to 1.5, a hydrogen partial pressure from about 100 to about 325 psig, a treat gas rate of about 500-1200 scf/b of at least 80% hydrogen (remainder inert gas), and a temperature of from about 500-750° F. Preferably, the reaction conditions include an LHSV of from about 0.9 to about 1.1, a hydrogen partial pressure from about 230 to about 270 psig, a hydrogen treat gas rate of about 600-1000 scf/b of at least 80% hydrogen (remainder inert gas), and a temperature of from about 600-650° F.

In yet another embodiment, the biocomponent portion of the feedstock can be pretreated to remove impurities prior to hydrotreatment. This pretreatment can occur prior to mixing the biocomponent portion of the feedstock with the mineral portion. The pretreatment can include passing the biocomponent portion through an adsorbent to remove metals, filtering the biocomponent portion to remove sediment, or other processes. Alternatively, an optional metals removal pretreatment can take place in the first reactor after mixing of the biocomponent and mineral hydrocarbon feeds, by exposing the combined feedstock to a demetallization catalyst under demetallization conditions prior to hydrodesulfurization and/or hydrodeoxygenation.

Optionally, the first hydrotreatment reactor can also include a quench mechanism, where a fluid is introduced into the reaction zone to control reaction temperature. This quench mechanism assists in maintaining a desired temperature in spite of the heat release due to the exothermic nature of hydrodeoxygenation of the biocomponent portion of the feedstock. The quench fluid can be a make-up hydrogen gas stream, an inert gas stream such as nitrogen, a liquid stream such as a liquid product stream of recycled product from the second hydrotreatment reactor, an additional flow of a mineral feedstock, or a combination of two or more of the above types of quench fluids.

After hydrotreatment, the output stream (treated combined feedstock) from the first reactor can optionally pass through a separator for removal of gas phase products from the liquid phase product produced in the first hydrotreatment reactor, such as $H_2S$, $CO$, $CO_2$, or $NH_3$. In such an embodiment, the hydrogen flow that passed through the first reactor is also separated from the liquid phase product.

After passing through the first hydrotreatment reactor, and any optional stripping vessel, the combined feedstock is then passed into a second hydrotreatment reactor. The second hydrotreatment reactor includes one or more catalyst beds containing a hydrotreating catalyst. The combined feedstock contacts the hydrotreating catalyst in the second hydrotreatment reactor under hydrodesulfurization conditions. In some embodiments, higher pressures are used in the second hydrotreatment reactor to remove the sulfur that was not susceptible to removal in the first reactor. The output stream from the second hydrotreatment reactor is a diesel fuel with an improved cetane number and a sulfur content of 10 ppm by weight or less.

The catalyst in the second hydrotreatment reactor can be a catalyst composed of a Group VIB metal and/or a Group VIII metal, optionally on a support. Suitable metals include nickel, molybdenum, tungsten, or combinations thereof. Suitable supports include silica, silica-alumina, alumina, and titania.

The reaction conditions in the second hydrotreatment reactor can be conditions suitable for reducing the sulfur content of the feedstream to about 10 ppm by weight or less as the feedstream is exposed to the catalyst beds in the reaction zone. The reaction conditions can include an LHSV of 0.5 to 1.5, a hydrogen partial pressure from about 250 to about 1500 psig, and a temperature of from about 550-750° F. Preferably, the reaction conditions include an LHSV of from about 0.9 to about 1.1, a hydrogen partial pressure from about 775 to about 925 psig, a hydrogen treat gas rate of about 950-1050 scf/b of at least 95% hydrogen (remainder inert gas), and a temperature of from about 625-675° F.

The output from the second hydrotreatment reactor can be optionally passed to another separation zone for separation of a vapor phase stream and a liquid phase product stream. After such a separation, the liquid phase product stream can optionally be passed to a hydroisomerization stage. The hydroisomerization stage can be used to further improve the cold-flow properties of the liquid phase product stream. In another optional embodiment, the hydrotreated feed can be blended with a feed containing fatty acid methyl esters, to further increase the amount of biocomponent.

In the optional hydroisomerization stage, the liquid phase product stream from the second reactor is exposed to one or more reaction zones, optionally present in a separate reactor, that are operated at hydroisomerization conditions in the presence of hydroisomerization catalyst. Suitable hydroisomerization catalysts include conventional hydroisomerization catalysts, such as zeolite or amorphous catalysts impregnated with a noble metal.

In an embodiment where the liquid phase product is hydroisomerized, the hydrogen treat gas used in the hydroisomerization reaction zones may be cascaded back to the first hydrotreatment reactor.

Due to the presence of a biocomponent portion of the feedstock, an increased amount of hydrogen may be needed in the first reactor relative to the amount of hydrogen needed for processing only a mineral feedstock. Thus, embodiments where hydrogen can be recycled will be preferred. However, the high oxygen content of biocomponent feedstock is believed to lead to increased carbon monoxide (CO), carbon dioxide ($CO_2$) and water ($H_2O$) production during hydrodeoxygenation. CO is a known inhibitor for hydrotreatment catalysts.

One side effect of the increased CO, $CO_2$, and $H_2O$ production is an increase in the corrosion risk for reactor components. Due to this increased production, the environment in the first reactor will be more corrosive than a typical reactor. Corrosion prevention steps include cladding of exposed surfaces, adding a corrosion inhibitor, or changing the materials used for exposed surfaces.

In a preferred embodiment, the additional CO production due to co-processing of biocomponent in the first reactor is addressed by having separate hydrogen recycle loops for the first reactor and the second reactor. In such an embodiment, hydrogen used in the first reactor is only recycled to the first reactor. While $CO_2$ can be readily removed, CO requires additional effort. Rather than allowing excess CO from the first hydrotreatment reactor to propagate throughout the reaction system, a dedicated hydrogen recycle loop can be used for the first reactor. This limits the CO buildup to the first reactor, which has a relatively modest desulfurization target (1000-2000 wppm S). The second reactor, which receives a deoxygenated feedstock and should have little or no CO formation, can then reduce the sulfur level in the feed to 10 wppm or less.

Figure 1:
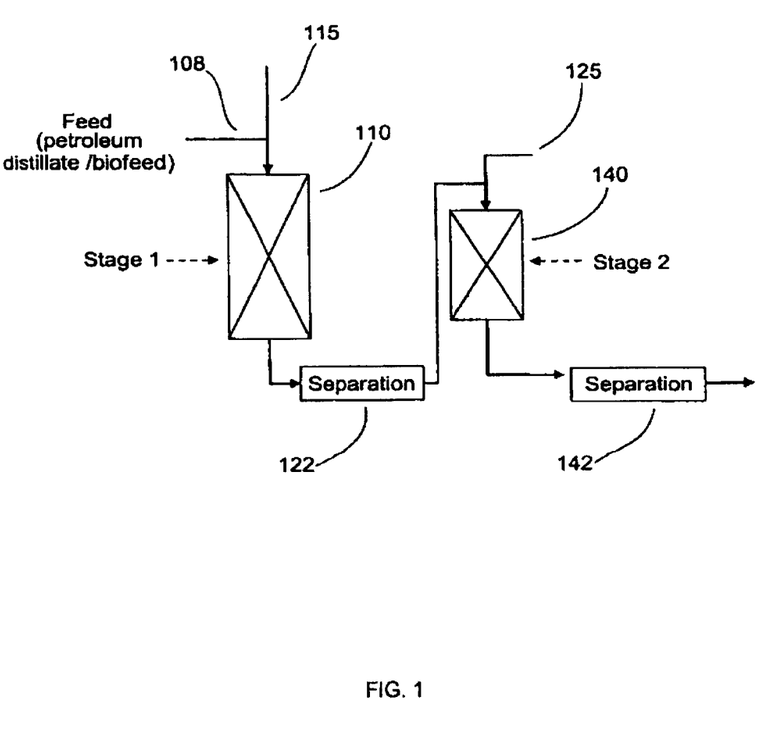
FIG. 1 schematically shows a reaction system for performing a process according to an embodiment of the invention.

A reaction system suitable for carrying out the above processes is shown schematically in FIG. 1. In FIG. 1, a combined mineral hydrocarbon and biocomponent feedstock 108 is introduced into a first hydrotreatment reactor 110. A hydrogen treat gas stream 115 is also introduced into hydrotreatment reactor 110. The combined feedstock is exposed to hydrotreating conditions in first hydrotreatment reactor 110 in the presence of one or more catalyst beds that contain hydrotreating catalyst. Preferably, this reduces the sulfur content of the treated feedstock to from about 1000 ppm to 1500 ppm by weight. The treated feedstock flows into a separator 122, where gas phase products are separated from liquid phase products. Optionally, a portion of the gas phase products separated by separator 122 may be cascaded back to the first reactor as a recycled hydrogen treat gas stream (not shown).

After passing through first hydrotreatment reactor 110 and optionally separator 122, the treated feedstock enters second hydrotreatment reactor 140, along with a second hydrogen treat gas stream 125. Due to the CO levels present in the first hydrotreatment reactor, it is desirable to minimize the flow of potentially CO-rich $H_2$ gas from the first stage to the second stage. The combined feedstock is exposed to hydrotreating conditions in the presence of one or more catalyst beds that contain hydrotreating catalyst. This reduces the sulfur content of the treated combined feedstocks to about 10 ppm by weight or less. Optionally, the treated feedstock can then pass through a separator 142 for separating gas and liquid products. In such an embodiment, hydrogen gas from separator 142 can be used as a recycled hydrogen gas stream (not shown) for the second hydrotreatment reactor.

Figure 2:
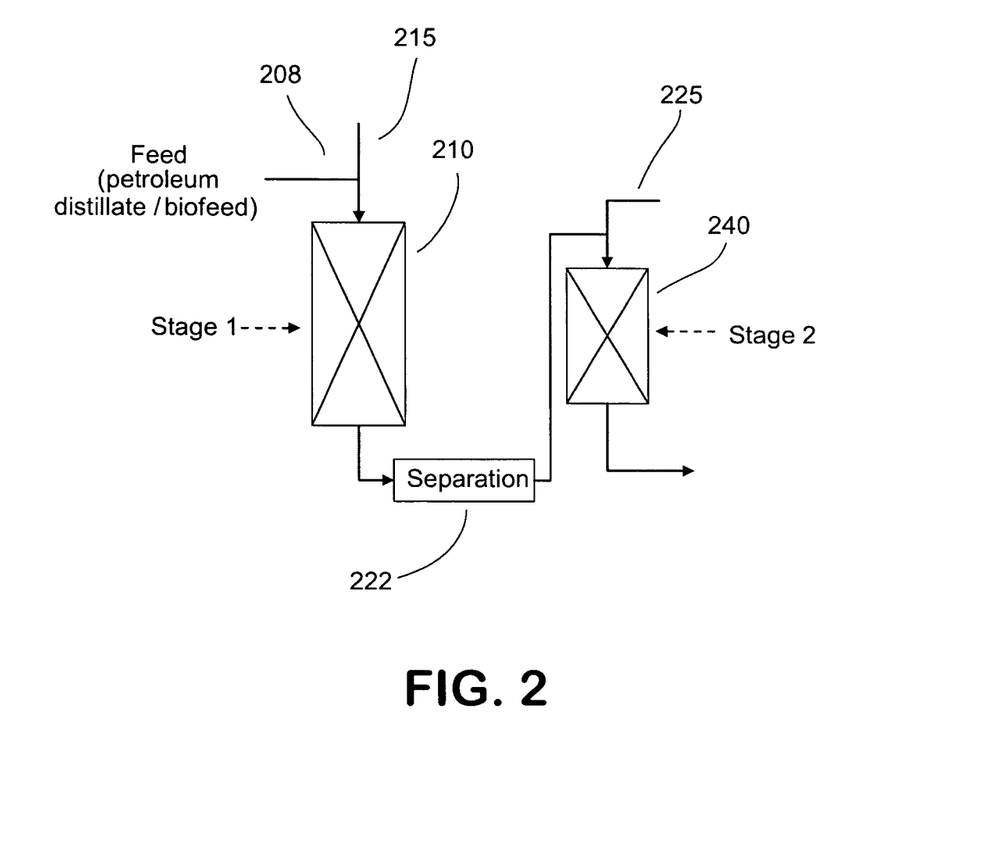
FIG. 2 schematically shows a reaction system for performing a process according to an embodiment of the invention.

In another embodiment, a common hydrogen recycle loop can be used for both hydrotreatment reactors. An example of this type of embodiment is shown in FIG. 2. In such an embodiment, the hydrogen recycle loop can include a water gas shift reactor and/or a $CO_2$ scrubber. The water gas shift reactor will convert CO present in the hydrogen into $CO_2$. This will allow the $CO_2$ scrubber to remove a larger percentage of the carbon oxides present in the hydrogen, thus reducing or minimizing the impact of the addition carbon oxides produced by hydrodeoxygenation of the biocomponent feedstock in the first hydrotreatment reactor. An amine scrubber is an example of a $CO_2$ scrubber. Other types of $CO_2$ scrubbers may be sufficiently effective for CO removal that the water gas shift reactor is not necessary.

A reaction system suitable for carrying out the above processes is shown schematically in FIG. 2. In FIG. 2, a combined mineral hydrocarbon and biocomponent feedstock 208 is introduced into a first hydrotreatment reactor 210. A hydrogen treat gas stream 215 is also introduced into hydrotreatment reactor 210. The combined feedstock is exposed to hydrotreating conditions in first hydrotreatment reactor 210 in the presence of one or more catalyst beds that contain hydrotreating catalyst. Preferably, this reduces the sulfur content of the treated feedstock to from about 1000 ppm to 1500 ppm by weight. The treated feedstock flows into a separator 222, where gas phase products are separated from liquid phase products. Optionally, a portion of the gas phase products separated by separator 222 may be cascaded back to the first reactor as a recycled hydrogen treat gas stream (not shown), or to the second reactor as a recycled hydrogen treat gas stream. Prior to entering a reactor, the recycled hydrogen treat gas is preferably passed through a water gas shift reactor, an amine scrubber, and/or other treatment components to remove excess carbon oxides from the treat gas.

After passing through first hydrotreatment reactor 220 and optionally separator 222, the treated feedstock enters second hydrotreatment reactor 240. The combined feedstock is exposed to hydrotreating conditions in the presence of one or more catalyst beds that contain hydrotreating catalyst. This reduces the sulfur content of the treated combined feedstocks to about 10 ppm by weight or less.

The product from the second reactor can undergo a variety of additional process steps. Optionally, the product from the second reactor can be separated into a gas phase product and a liquid phase product using a separator. The gas phase product from the separator can be recycled for further use in the second hydrotreating reactor. After separation, the liquid product from the second hydrotreating reactor can be exposed to a hydroisomerization catalyst under hydroisomerization conditions. Optionally, before such a hydroisomerization step, the liquid stream can be passed through a liquid treatment step, such as by exposing the liquid to filtration, a caustic solution wash, or a treatment with chemical agents to remove sulfur and trace contaminants. Alternatively, the liquid stream can be passed through a sulfur adsorption step, such as by exposing the liquid stream to metallic Ni, ZnO, or another adsorber of sulfur species.

Example 1

Single Reactor Processing

Figure 3:
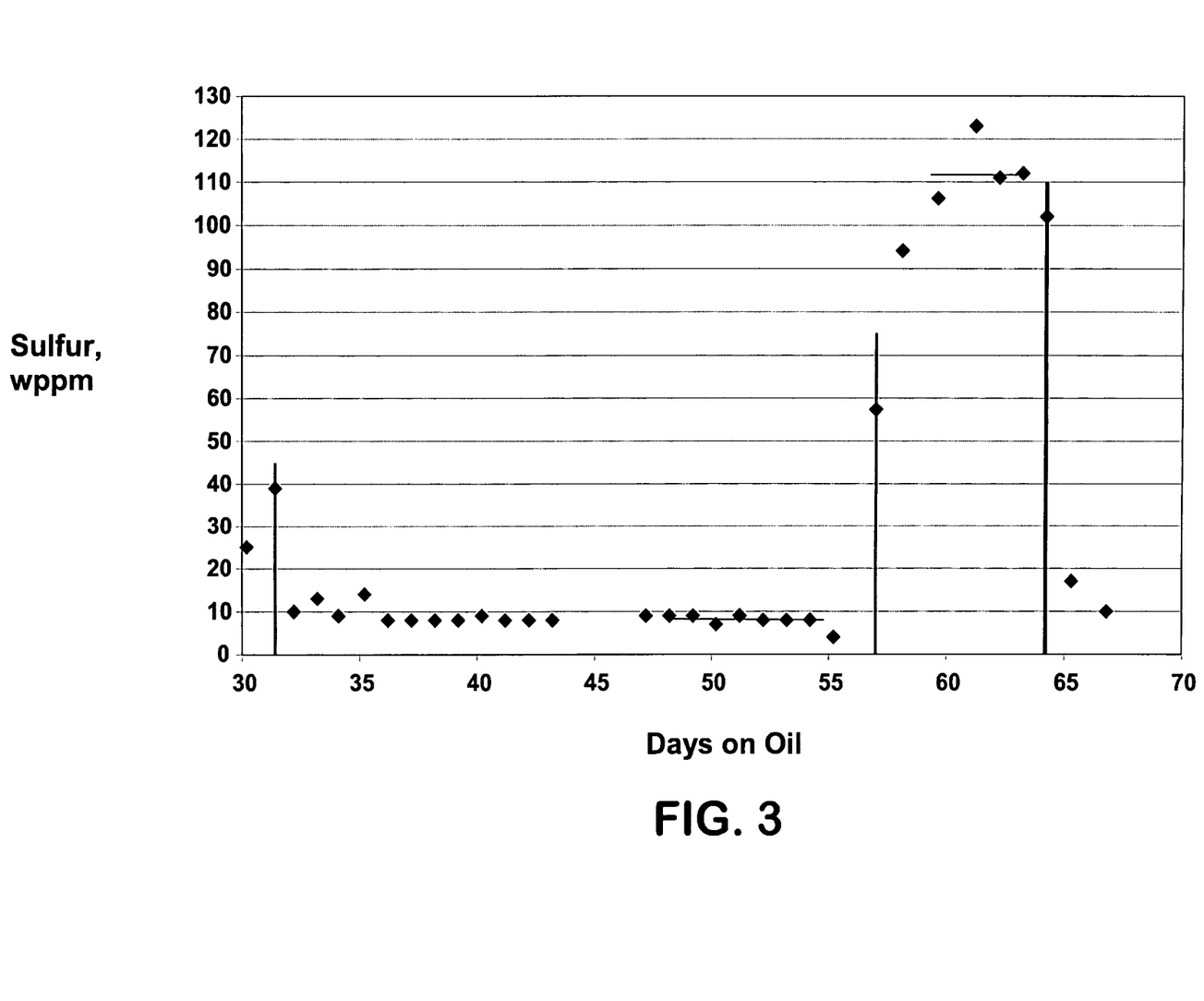
FIGS. 3-4 depict data from processing runs for co-processing of biocomponent and mineral feedstocks.

The following example demonstrates the difficulty in co-processing of a bio-component feed. In this example, a feedstock is hydrotreated with a commercially available CoMo catalyst under hydrotreatment conditions. FIG. 3 shows data related to the sulfur content of the resulting treated feedstock. Initially, a mineral distillate feedstock containing 0.9 wt % sulfur was hydrotreated at 647° F. (342° C.), a total pressure of 390 psig, a treat gas rate of 1295 scf/bbl of 80% $H_2$, and an LHSV of 0.3. As shown in FIG. 3, the Days on Oil corresponding to treatment of the mineral feed demonstrate that the conditions were sufficient to reduce the sulfur content to 10 wppm or less. At day 57, 10% by weight of palm oil was added to the mineral feedstock. The treat gas rate was also increased to 1480 scf/bbl to account for the increased oxygen content of the palm oil. Under these conditions, the sulfur content in the treated feedstock jumped to a value of about 100 wppm. When the feed into the reactor was changed back to only the mineral distillate feed, the sulfur content of the resulting treated feedstock fell below 10 wppm. Without being bound by any particular theory, it is believed that the presence of oxygenates in the palm oil results in an inhibition of catalyst activity, resulting in a higher sulfur level in the treated feedstock.

Example 2

Multi-Stage Co-Processing

Figure 4:
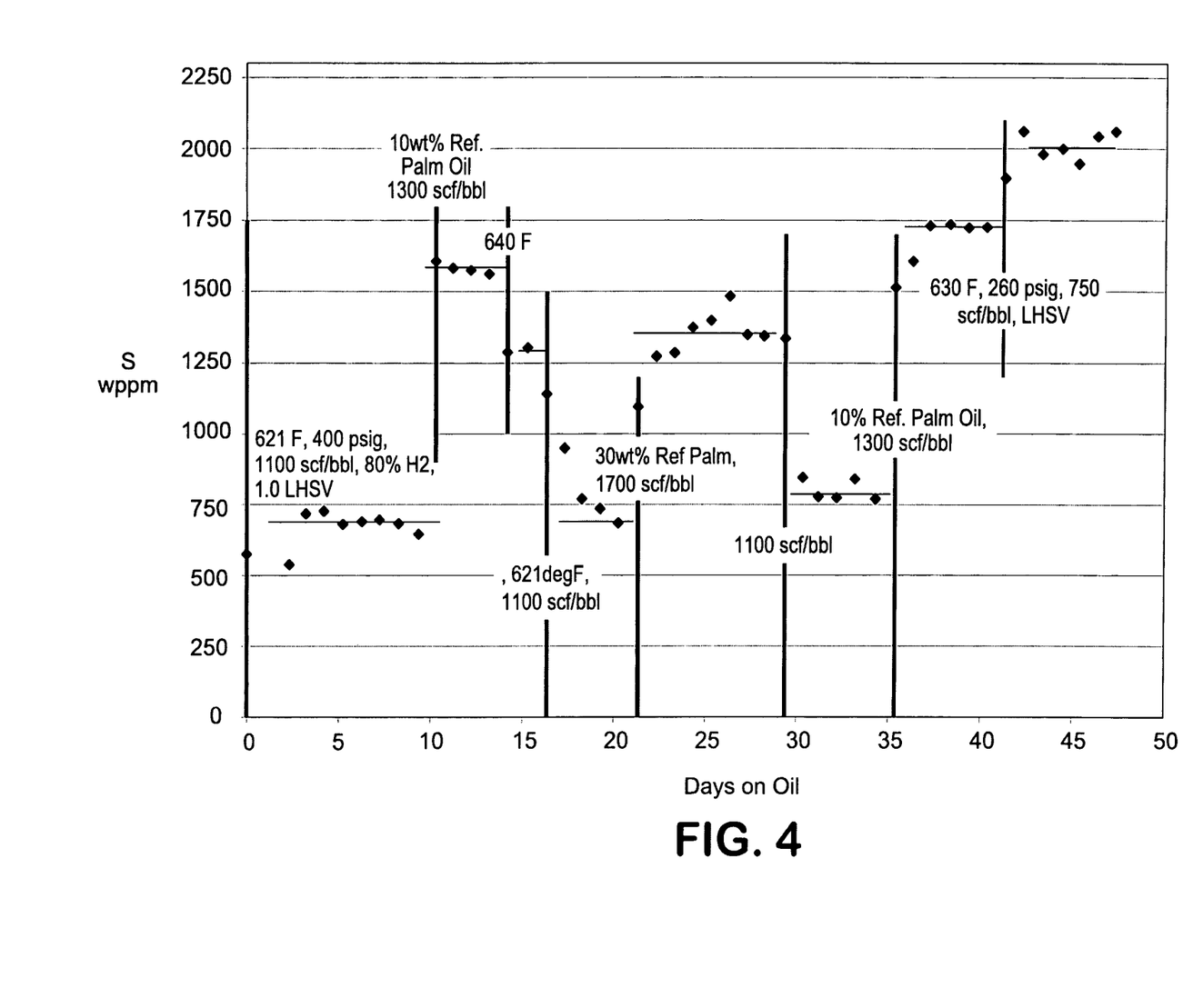

To overcome the difficulties in co-processing of biocomponent feedstock, a two stage reactor can be used. The conditions in the first stage can be selected to remove substantially all of the oxygen from the biocomponent feed, while reducing the sulfur in the feedstock to a manageable level. FIG. 4 shows the sulfur in the resulting product for the indicated reactor conditions and types of feedstocks processed. The initial processing conditions included a temperature of 621° F. (327° C.), a pressure of 400 psig, a hydrogen flow rate of 1100 scf/bbl of 80% $H_2$, and a space velocity of 1.0. At the indicated times during processing, the conditions were modified to either increase or decrease the hydrogen flow rate (to 1300 scf/bbl, 1700 scf/bbl, or 750 scf/bbl), increase the temperature (to 630° F./332° C. or 640° F./337° C.), or to change the amount of palm oil included in the mineral feedstock (10 or 30 wt %). As shown in FIG. 4, the mineral feedstock was a distillate feedstock containing 0.9 wt % sulfur. Note that the biocomponent contained little or no sulfur, so addition of the biocomponent feed to the mineral distillate feed led to a reduction in sulfur content.

In addition to sulfur removal, substantially all oxygen was removed from the mineral and biocomponent mixed feedstock for the products shown in FIG. 4. All of the conditions selected resulted in removal of at least 95% of the oxygen present in the feedstock. This is believed to be sufficient to prevent the catalytic inhibition associated with processing of biocomponent feedstocks. Thus, a second hydrotreatment reactor would be able to remove the remaining sulfur to produce a diesel fuel with 10 wppm of sulfur or less.

In embodiments where the amount of biocomponent is 20% or less of the total feed, the resulting product will have similar characteristics to a product produced from only mineral feed. For example, Table 2 shows the resulting products from hydrodesulfurization of two feedstocks. The first product is the result of hydroprocessing a heavy atmospheric gas oil mineral feedstock. The second product is the result of hydroprocessing a feedstock containing 90% by weight of the same mineral feedstock, and 10% by weight of palm oil. These products were generated using reaction conditions similar to the conditions used for the processes in FIG. 4. As shown in Table 1, introduction of 10% by weight of palm oil has only a modest impact on the characteristics of the resulting diesel product. The addition of palm oil in the feedstock appears to slightly increase the API of the resulting diesel product. Note that the addition of the palm oil would be expected to increase the paraffin content of the resulting diesel product, as nearly all of the palm oil is expected to be converted into paraffinic molecules. However, the overall boiling point profile of the product is only slightly changed. Note that the 10% by weight palm oil characteristics represent ranges of product characteristics generated by processing of several samples.

TABLE 1

|  | Mineral feed product | With 10 wt % Palm Oil |
| --- | --- | --- |
| API | 31.0 | 32.1-32.4 |
| Cloud Point, ° C. | 14.3 | 12.0-13.7 |
| Pour Point, ° C. | 11 | 6-10 |
| GCD, ° F. |  |  |
| IBP | 345 | 347-375 |
| 5% | 510 | 514-517 |
| 10% | 565 | 550-551 |
| 30% | 654 | 632-636 |
| 50% | 689 | 677-682 |
| 70% | 716 | 706-712 |
| 90% | 754 | 746-751 |
| 95% | 772 | 765-770 |
| FBP | 815 | 813-817 |

Table 2 provides another comparison between product properties for diesel produced from another gas oil mineral feed and a 10 wt % palm oil feed. As for the heavy atmospheric gas oil in Table 1, addition of 10% by weight of palm oil results in an increase in API. Otherwise, the product profiles are similar.

TABLE 2

|  | Mineral feed product | With 10 wt % Palm Oil |
| --- | --- | --- |
| API | 36.5 | 37.3 |
| Cloud Point, ° C. | 2 | 2 |
| Pour Point, ° C. | −4 | −4 |
| GCD, ° F. |  |  |
| IBP | 209 | 215 |
| 5% | 383 | 391 |
| 10% | 438 | 446 |
| 30% | 528 | 531 |
| 50% | 578 | 577 |
| 70% | 629 | 626 |
| 90% | 698 | 697 |
| 95% | 730 | 728 |
| FBP | 817 | 817 |

The invention claimed is:

1. A method for producing a low sulfur diesel product, comprising:
    introducing a feedstock having a T5 boiling point of about 300° F. or greater and containing a biocomponent portion of up to 20% by weight into a first reaction zone;
    hydrotreating the feedstock in the first reaction zone under first effective hydrotreating conditions to produce a first hydrotreated feedstock having a sulfur content less than about 2500 ppm by weight, wherein at least 90 wt % of the oxygen is removed from the feedstock;

separating the first hydrotreated feedstock into a vapor stream and a liquid stream, the vapor portion containing hydrogen gas;

passing at least a portion of first hydrotreated feedstock to a second reaction zone without passing the vapor portion containing hydrogen gas;

hydrotreating the portion of the first hydrotreated feedstock in the second reaction zone under second effective hydrotreating conditions to produce a diesel boiling range product.

2. A method for producing a low sulfur diesel product, comprising:

introducing a feedstock having a T5 boiling point of about 300° F. or greater and containing a biocomponent portion of up to 20% by weight into a first reaction zone;

hydrotreating the feedstock in the first reaction zone under first effective hydrotreating conditions to produce a first hydrotreated feedstock having a sulfur content less than about 2500 ppm by weight, wherein at least 90 wt % of the oxygen is removed from the feedstock;

separating the first hydrotreated feedstock into a vapor stream and a liquid stream, the vapor portion containing hydrogen gas;

passing at least a portion of the vapor stream into a hydrogen recycle loop;

passing at least a portion of the liquid stream to a second reaction zone;

hydrotreating the liquid portion of the first hydrotreated feedstock in the second reaction zone under second effective hydrotreating conditions to produce a hydrotreated product having a sulfur content of about 10 ppm by weight or less;

separating the hydrotreated product into a vapor product and a diesel boiling range product, the vapor product containing hydrogen gas;

passing at least a portion of the vapor product into the hydrogen recycle loop;

treating the portion of the vapor stream and the portion of the vapor product in the hydrogen recycle loop with a CO removal system;

passing hydrogen from the hydrogen recycle loop into the first reaction zone as a hydrogen treat gas.

3. The method of claim 2, wherein the CO removal system includes a $CO_2$ scrubber.

4. The method of claim 2, wherein the CO removal system is an amine scrubber and a water gas shift reactor.

5. The method of claim 1, wherein the biocomponent feedstock comprises palm oil.

6. The method of claim 1, wherein the mineral hydrocarbon feedstock has T95 boiling point of 775° F. or less.

7. The method of claim 1, wherein the mineral hydrocarbon feedstock is an atmospheric gas oil, a vacuum gas oil, or a light cycle oil.

8. The method of claim 1, wherein the biocomponent feedstock comprises a biocomponent portion and a mineral hydrocarbon diluent.

9. The method of claim 1, further comprising hydroisomerizing the diesel boiling range product.

10. The method of claim 1, wherein at least 95 wt % of the oxygen is removed from the feedstock.

11. The method of claim 1, wherein at least 98 wt % of the oxygen is removed from the feedstock.

12. The method of claim 1, wherein the oxygen content of the first hydrotreated feedstock is 0.1 wt % or less.

13. The method of claim 1, wherein the oxygen content of the first hydrotreated feedstock is 0.05 wt % or less.

14. The method of claim 1, wherein the oxygen content of the first hydrotreated feedstock is 0.01 wt % or less.

15. The method of claim 1, wherein the first effective hydrotreating conditions include an LHSV of 0.5 to 1.5, a hydrogen partial pressure from about 100 to about 300 psig, a hydrogen treat gas rate of about 650-750 scf/b of at least 80% hydrogen (remainder inert gas), and a temperature of from about 500-750° F.

16. The method of claim 1, wherein the first effective hydrotreating conditions include an LHSV of from about 0.9 to about 1.1, a hydrogen partial pressure from about 230 to about 270 psig, a hydrogen treat gas rate of about 650-750 scf/b of at least 80% hydrogen (remainder inert gas), and a temperature of from about 600-650° F.

17. The method of claim 1, wherein the second effective hydotreating conditions include an LHSV of 0.5 to 1.5, a hydrogen partial pressure from about 250 to about 1500 psig, a hydrogen treat gas rate of about 950-1050 scf/b of at least 95% hydrogen (remainder inert gas), and a temperature of from about 550-750° F.

18. The method of claim 1, wherein the second effective hydrotreating conditions include an LHSV of from about 0.9 to about 1.1, a hydrogen partial pressure from about 775 to about 925 psig, a hydrogen treat gas rate of about 950-1050 scf/b of at least 95% hydrogen (remainder inert gas), and a temperature of from about 625-675° F.

19. The method of claim 1, wherein the sulfur content of the introduced feedstock is 0.25 wt % or greater.

20. The method of claim 1, wherein the sulfur content of the introduced feedstock is 2 wt % or greater.

21. The method claim 2, wherein the biocomponent feedstock comprises palm oil.

22. The method of claim 2, wherein the mineral hydrocarbon feedstock has T95 boiling point of 775° F. or less.

23. The method of claim 2, wherein the mineral hydrocarbon feedstock is an atmospheric gas oil, a vacuum gas oil, or a light cycle oil.

24. The method of claim 2, wherein the biocomponent feedstock comprises a biocomponent portion and a mineral hydrocarbon diluent.

25. The method of claim 2, further comprising hydroisomerizing the diesel boiling range product.

26. The method of claim 2, wherein at least 95 wt % of the oxygen is removed from the feedstock.

27. The method of claim 2, wherein at least 98 wt % of the oxygen is removed from the feedstock.

28. The method of claim 2, wherein the oxygen content of the first hydrotreated feedstock is 0.1 wt % or less.

29. The method of claim 2, wherein the oxygen content of the first hydrotreated feedstock is 0.05 wt % or less.

30. The method of claim 2, wherein the oxygen content of the first hydrotreated feedstock is 0.01 wt % or less.

31. The method of claim 2, wherein the first effective hydrotreating conditions include an LHSV of 0.5 to 1.5, a hydrogen partial pressure from about 100 to about 300 psig, a hydrogen treat gas rate of about 650-750 scf/b of at least 80% hydrogen (remainder inert gas), and a temperature of from about 500-750° F.

32. The method of claim 2, wherein the first effective hydrotreating conditions include an LHSV of from about 0.9 to about 1.1, a hydrogen partial pressure from about 230 to about 270 psig, a hydrogen treat gas rate of about 650-750 scf/b of at least 80% hydrogen (remainder inert gas), and a temperature of from about 600-650° F.

33. The method of claim 2, wherein the second effective hydotreating conditions include an LHSV of 0.5 to 1.5, a hydrogen partial pressure from about 250 to about 1500 psig, a hydrogen treat gas rate of about 950-1050 scf/b of at least 95% hydrogen (remainder inert gas), and a temperature of from about 550-750° F.

34. The method of claim 2, wherein the second effective hydrotreating conditions include an LHSV of from about 0.9 to about 1.1, a hydrogen partial pressure from about 775 to about 925 psig, a hydrogen treat gas rate of about 950-1050 scf/b of at least 95% hydrogen (remainder inert gas), and a temperature of from about 625-675° F.

35. The method of claim 2, wherein the sulfur content of the introduced feedstock is 0.25 wt % or greater.

36. The method of claim 2, wherein the sulfur content of the introduced feedstock is 2 wt % or greater.

\* \* \* \* \*